(12) United States Patent
Doh et al.

(10) Patent No.: US 8,049,666 B2
(45) Date of Patent: Nov. 1, 2011

(54) REGIONAL POSITIONING METHOD AND APPARATUS IN WIRELESS SENSOR NETWORK

(75) Inventors: Yoonmee Doh, Daejeon (KR); Noseong Park, Daejeon (KR); Hyunhak Kim, Daejeon (KR); Sun-Joong Kim, Daejeon (KR); Cheol Sig Pyo, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 376 days.

(21) Appl. No.: 12/261,656

(22) Filed: Oct. 30, 2008

(65) Prior Publication Data
US 2009/0153402 A1   Jun. 18, 2009

(30) Foreign Application Priority Data
Dec. 17, 2007   (KR) .......................... 10-2007-0132203

(51) Int. Cl.
*H01Q 21/06* (2006.01)
*H01Q 21/24* (2006.01)
*H01Q 7/10* (2006.01)

(52) U.S. Cl. ....................................... 342/363

(58) Field of Classification Search ................... 342/363
See application file for complete search history.

(56) References Cited

U.S. PATENT DOCUMENTS

| | | | | |
|---|---|---|---|---|
| 6,891,500 | B2 * | 5/2005 | Hall et al. | 342/465 |
| 7,092,726 | B2 * | 8/2006 | Shi et al. | 455/456.6 |
| 7,304,610 | B2 * | 12/2007 | Ninomiya et al. | 342/457 |
| 7,395,073 | B2 * | 7/2008 | Gwon et al. | 455/456.1 |
| 2005/0128143 | A1 * | 6/2005 | Dempsey et al. | 342/463 |
| 2008/0080441 | A1 * | 4/2008 | Park et al. | 370/338 |
| 2010/0177681 | A1 * | 7/2010 | Sahinoglu | 370/328 |

FOREIGN PATENT DOCUMENTS
EP   1 617 601 A2   1/2006
* cited by examiner

*Primary Examiner* — Thomas Tarcza
*Assistant Examiner* — Frank McGue
(74) *Attorney, Agent, or Firm* — Kile Park Goekjian Reed & McManus PLLC

(57) ABSTRACT

A regional positioning method and apparatus in a wireless sensor network (WSN) is provided. The regional positioning method in a WSN, the regional positioning method including: setting a locating premise in the WSN based on a signal strength of an anchor node; sensing an event where a sensor node, installed in a target and called a target node, joins the WSN; detecting a locating premise where the target node is located based on the sensing of the event; and recognizing a location of the target based on the detected locating premise.

16 Claims, 9 Drawing Sheets

REGIONAL POSITIONING METHOD AND APPARATUS IN WIRELESS SENSOR NETWORK

CROSS-REFERENCE TO RELATED APPLICATION

This application claims priority from Korean Patent Application No. 10-2007-0132203, filed on Dec. 17, 2007, in the Korean Intellectual Property Office, the entire disclosure of which is incorporated herein by reference.

BACKGROUND OF THE INVENTION

1. Field of the Invention

The present invention relates to a regional positioning method and apparatus in a wireless sensor network (WSN).

This work was supported by the IT R&D of MIC/IITA. [2006-S-601-02, development of distributed sensor network system]

2. Description of Related Art

A ubiquitous sensor network (USN) is referred to as a wireless sensor network (WSN) including a sensor node equipped with a sensor capable of catching information from an object or environment where the node is installed. In a USN, information received from a variety of sensors is processed and managed in real time by connecting to an external network through a network. A USN embodies an environment where communications are possible among objects anywhere and anytime regardless of a network, device, and service.

FIG. 1 is a diagram illustrating a general configuration of a USN and WSN.

As illustrated in FIG. 1, the sensor network may include a sensor node 110, sensor field 120, sink 130, and gateway 140. The sensor node 110 includes sensors and a communication module. The sensor recognizes information about an object and environment. The sensor field 120 includes a set of sensor nodes 110. The sink 130 receives information collected in the sensor field 120. The gateway 140 performs routing with respect to information transmitted from the sink 130 and transmits the information to a management server 160 through a broadband communication network 150. The sensor network may be connected to an existing infrastructure such as those used for satellite communications, wireless local area network (LAN), Bluetooth, and wired Internet, through the gateway 140.

FIG. 2 is a diagram illustrating a general configuration of a sensor node in a WSN.

As illustrated in FIG. 2, the sensor node includes a central processing unit (CPU) and memory 210, communication module 220, sensor module 230, signal processing module 240, and software 250, and a battery/energy source 260 to provide power to the sensor node. Due to a sensor node's characteristic that the sensor node is operated with limited battery power, low power consumption is critical when designing sensor nodes. Accordingly, a hardware circuit is usually configured using low power elements, for example, a low capable CPU, and a low power communication element and peripheral circuit.

FIG. 3 is a diagram illustrating a general positioning method in a sensor network through sensing a targeted object.

As illustrated in FIG. 3, in the positioning method, a sensor network field includes a sensor node 310 where a sensor 330 and analog to digital (A/D) or digital to analog (D/A) converter 320 are installed. The sensor 330 senses characteristics of a target 340, for example, movement, material, weight, and the like. When it is sensed that the target 340 enters a sensing area 380 as illustrated in a location 350, location information of the sensed target 340 is transmitted to a sink or gateway 370 through a multi-hop communication, and thus a location of the target 340 may be recognized.

In a traditional positioning method, a location of a target may be detected when the target enters a sensing area, due to a characteristic of a sensor network. However, when the target does not clearly enter the sensing area or when a valid sensing area is not appropriately distributed, the location of the target may not be detected.

Also, in a traditional positioning method, a location of a target may be detected using a calculation method based on a radio signal strength as opposed to the above-described method using the entry to the sensing area. The method is divided into a scheme utilizing measured distance information and a scheme without utilizing distance information. In the scheme utilizing the distance information, a distance is measured between a targeted node with respect to its location and each of at least three anchor nodes whose locations are already known. After measuring the three distance values, a triangulation is performed to find out the location. In this instance, the distances may be measured by a Time of Arrival (ToA), Time Difference of Arrival (TDoA), Received Signal Strength (RSS), and the like. The scheme without utilizing distance information includes a centroid method, Approximate Point In Triangulation (APIT), and the like. A distance-based method in a multi-hop sensor network may overcome a disadvantage where an error may be spread to the sensor network. In the centroid method, location information of regularly-arranged anchor nodes is transmitted to neighboring nodes, the neighboring nodes receiving the location information compare strengths of signals transmitted from the anchor nodes, and thus a location of each of the neighboring nodes may be predicted.

However, in the centroid method, traffic load in the sensor network may vary depending on a position of a locating engine performing the calculation. For example, when the locating engine is placed in the sink of the sensor network, multiple signal strength information collected based on a targeted node is transmitted via multi-hop. Accordingly, the additional traffic is loaded in the sensor network. When the locating engine is placed in a target, power is consumed to receive radio signal strength information from neighboring nodes and calculate the radio signal strength information, which affects a network lifetime. Accordingly, hardware solution is preferred to software when the locating engine is located in the target.

SUMMARY OF THE INVENTION

An aspect of the present invention provides a regional positioning method and apparatus in a wireless sensor network (WSN) which may recognize a location of a target based on a connection setting of a sensor node called a target node and installed in the target.

Another aspect of the present invention also provides a regional positioning method and apparatus in a WSN which sets a locating area that may be sorted as a communication radius in a sensor network, and thereby may recognize a location of a target.

Another aspect of the present invention also provides a regional positioning method and apparatus in a WSN which obtains approximate regional location information, and thereby may reduce a load of a network as well as satisfy an application requirement.

According to an aspect of the present invention, there is provided a regional positioning method of a wireless sensor network (WSN), the regional positioning method including: setting a locating premise in the WSN based on a signal strength of an anchor node; sensing an event where a sensor node, installed in a target and called a target node, joins the WSN; detecting a locating premise where the target node is located based on the sensing of the event; and recognizing a location of the target based on the detected locating premise.

According to an aspect of the present invention, the regional positioning method further including: setting a network connection relationship between the target node and the anchor node, when the target node senses a signal of the anchor node; and generating the event corresponding to the set network connection relationship, wherein the recognizing comprises: retrieving the anchor node where the network connection relationship with the target node is set based on the event; and detecting a locating premise corresponding to the retrieved anchor node.

According to an aspect of the present invention, the regional positioning method further including: dividing the locating premise into an overlapped area and a non-overlapped area further based on sensing information sensed by a plurality of sensors installed in the anchor node, wherein the detecting comprises: detecting whether the target node is located in the overlapped area or the non-overlapped area using the sensing information.

According to an aspect of the present invention, the regional positioning method further including: computing location information about the set locating premises using location information of the anchor node, wherein the recognizing comprises: recognizing the location of the target using the computed location information of the anchor node.

According to an aspect of the present invention, the regional positioning method further including: transmitting information about the recognized location of the target node to a sink through a multi-hop communication to enable the information to be transmitted to a management server.

According to an aspect of the present invention, the regional positioning method further including: receiving identification information about the target from the target node; and transmitting the received identification information to a sink through a multi-hop communication to enable the identification information to be transmitted to a management server.

According to an aspect of the present invention, there is provided a regional positioning apparatus in a WSN, the regional positioning apparatus including: an area setting unit to set a locating premise in the WSN based on a signal strength of an anchor node; an event sensing unit to sense an event where a sensor node, installed in a target and called a target node, joins the sensor network; and a location recognition unit to detect a locating premise where the target node is located based on the sensing of the event, and recognize a location of the target based on the detected locating premise.

In an aspect of the present invention, the regional positioning apparatus further including: an event generation unit to set, when the target node senses a signal of the anchor node, a network connection relationship between the target node and the anchor node, and generate the event corresponding to the set network connection relationship, wherein the location recognition unit retrieves the anchor node where the network connection relationship with the target node is set based on the event, and detects a locating premise corresponding to the retrieved anchor node.

In an aspect of the present invention, the area setting unit divides the set locating premise into an overlapped area and a non-overlapped area further based on sensing information sensed by a plurality of sensors installed in the anchor node, and the location recognition unit detects whether the target node is located in the overlapped area or the non-overlapped area using the sensing information.

In an aspect of the present invention, the area setting unit computes location information about the set locating premise using location information of the anchor node and the location recognition unit recognizes the location of the target node using the computed location information of the anchor node.

In an aspect of the present invention, the location recognition unit transmits information about the recognized location of the target to a sink through a multi-hop communication to enable the information to be transmitted to a management server.

In an aspect of the present invention, the location recognition unit receives identification information about the target from the sensor node, and transmits the received identification information to a sink through a multi-hop communication to enable the identification information to be transmitted to a management server.

BRIEF DESCRIPTION OF THE DRAWINGS

The above and other aspects of the present invention will become apparent and more readily appreciated from the following detailed description of certain exemplary embodiments of the invention, taken in conjunction with the accompanying drawings of which.

DETAILED DESCRIPTION OF EXEMPLARY EMBODIMENTS

Figure 1:
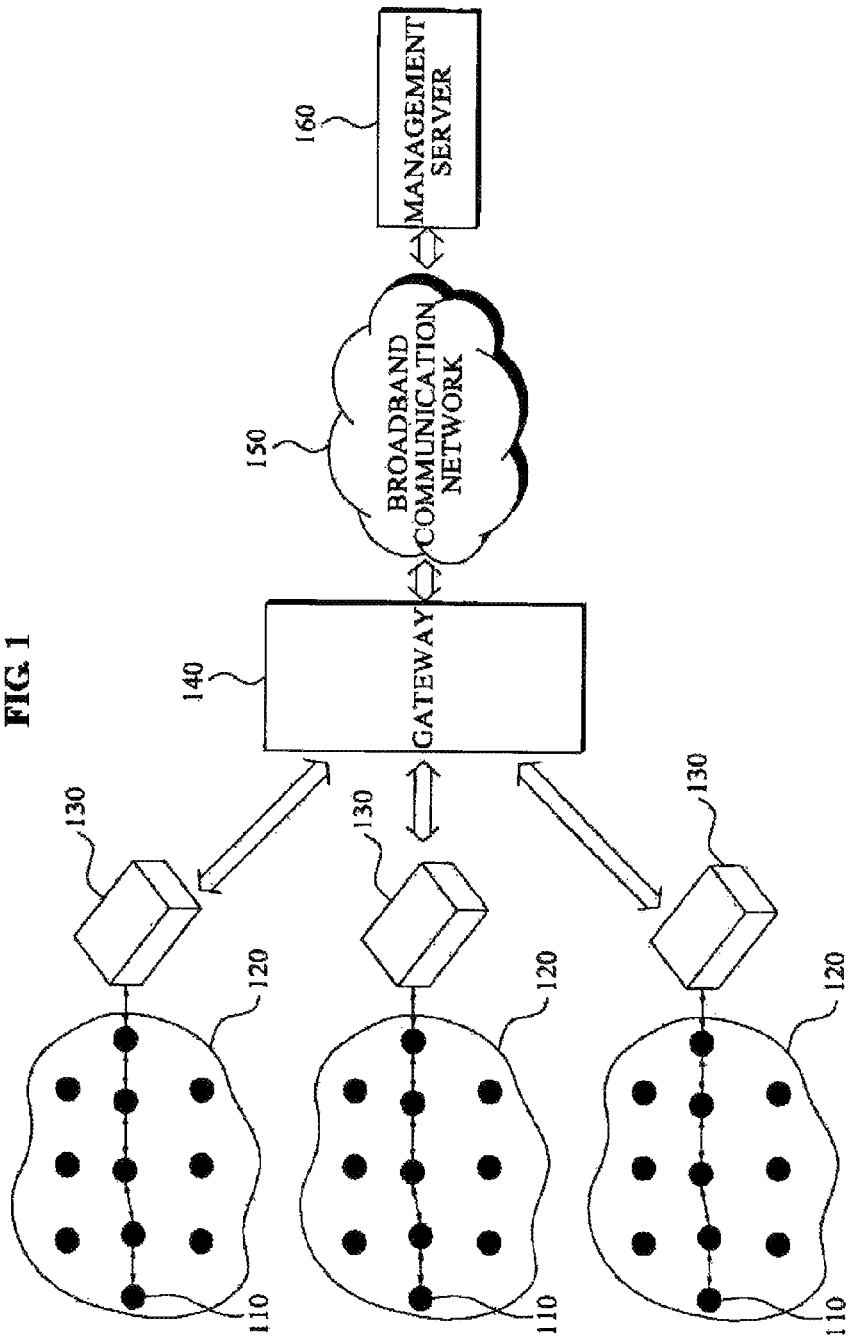
FIG. 1 is a diagram illustrating conventional art of a general configuration of a ubiquitous sensor network (USN) and wireless sensor network (WSN)
Figure 2:
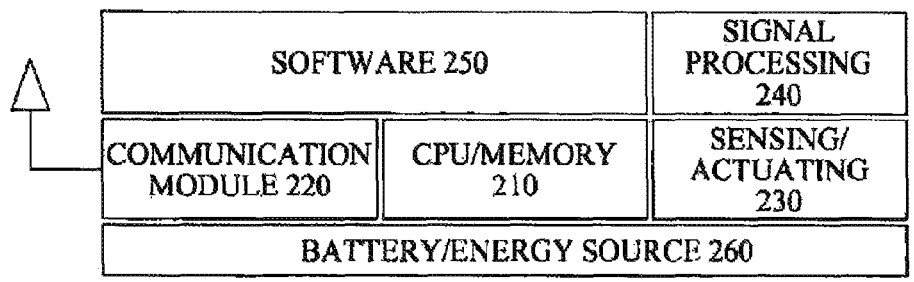
FIG. 2 is a diagram illustrating conventional art of a general configuration of a sensor node in a WSN.
Figure 3:
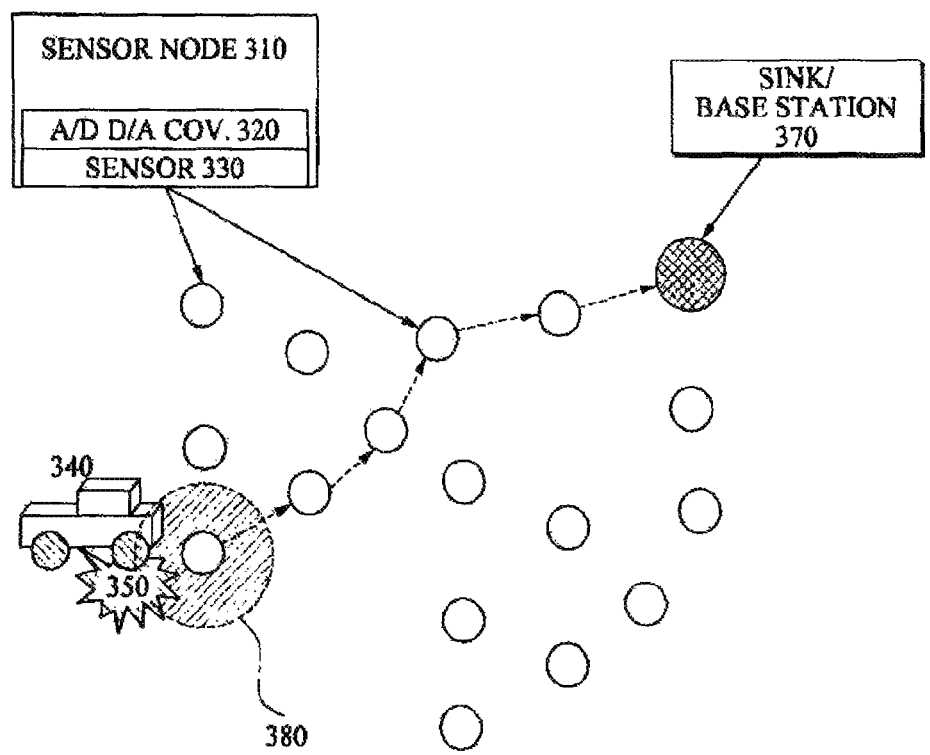
FIG. 3 is a diagram illustrating conventional art of a general positioning method in a sensor network through sensing a targeted object.

Reference will now be made in detail to exemplary embodiments of the present invention, examples of which are illustrated in the accompanying drawings, wherein like reference numerals refer to the like elements throughout. The exemplary embodiments are described below in order to explain the present invention by referring to the figures.

In a variety of applications, a range of an allowable error of a target locating may vary, which may be associated with a resolution that represents a location based on a characteristic of the target locating.

For example, in a case of company asset locating, most of the company assets are required to be recognized and confirmed more precisely in an indoor and outdoor space having various characteristics, and thus an algorithm with a low error rate is required. Conversely, in a case of vehicle locating in a parking lot, a service expectation may be satisfied by a human visual recognition based on location information recognized within an approximate area. That is, less precision may be allowed. In this specification, 'locating' is the same as 'positioning'.

According to an embodiment of the present invention, it is described a positioning apparatus and method that obtains approximate regional location information, which is more simple than a method of determining a location based on a transmission and calculation of a number of radio signals or their strengths. The positioning apparatus is for reducing a network traffic load and satisfying an application requirement. Also, according to an embodiment of the present invention, it is described a positioning apparatus and method which may recognize a location of a target by installing a sensor node in a target object instead of recognizing the location of the target through an access into a sensing area.

Hereinafter, a regional positioning method in a wireless sensor network (WSN) according to the present invention is described in detail by referring to accompanying drawings. In the present invention, the regional positioning method in the WSN according to the present invention may be embodied by a regional positioning apparatus.

Figure 4:
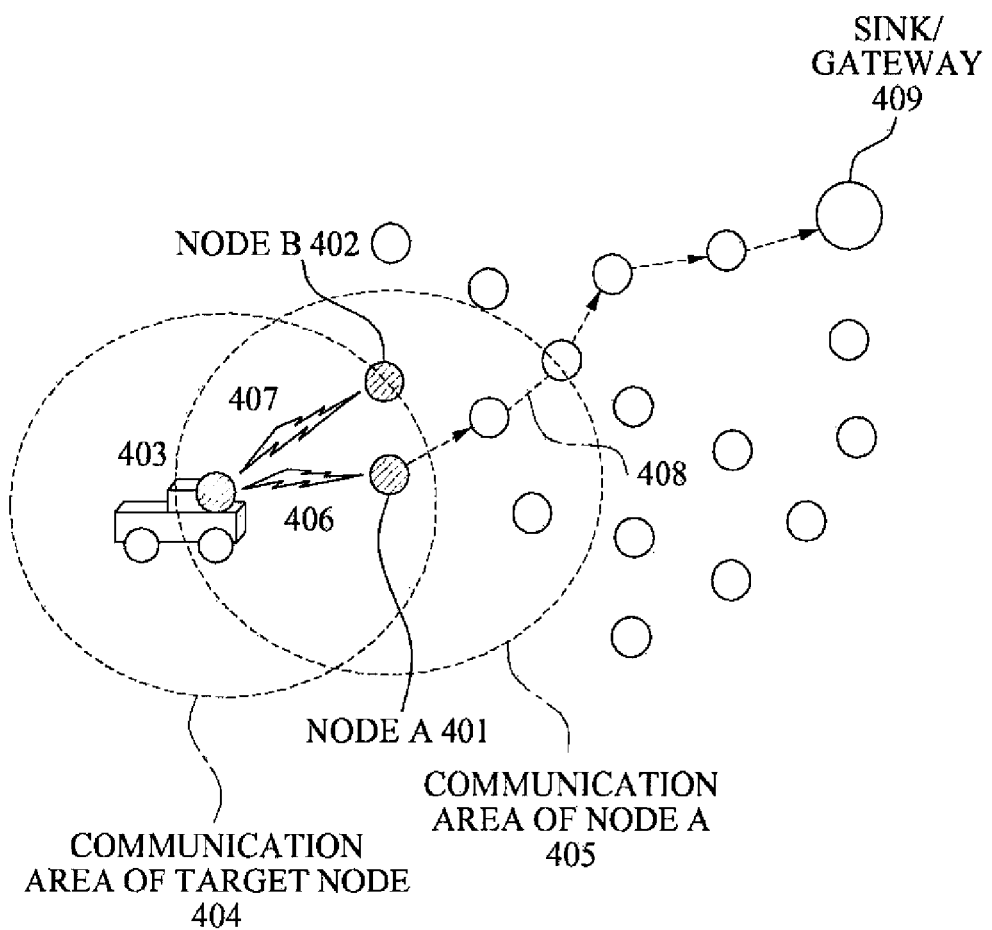
FIG. 4 is a diagram illustrating an example of a positioning method with respect to a target object based on a connection relationship according to an exemplary embodiment of the present invention.

FIG. 4 is a diagram illustrating an example of a positioning method with respect to a target object based on a connection relationship according to an exemplary embodiment of the present invention.

By referring to FIG. 4, a WSN includes a sink/gateway 409 and a number of sensor nodes including a node A 401 and a node B 402 which act as anchor nodes. Communication areas of the sensor nodes may indicate a signal strength of each of the sensor nodes. The signal strength may be generally represented as a two-dimensional circle like a communication area 404 of a target and a communication area 405 of the node A 401. The communication areas of the sensor nodes may be three-dimensionally represented as different emission features of signal strength according to a direction as opposed to a simple 2 dimensional square.

In the WSN, when the target where the sensor node 403 is installed has the communication area 404 of the target and is located around or accesses the node A 401 and the node B 402, the sensor node 403 installed in the target performs a network connection to join the WSN. In this instance, the sensor node 403 may determine which one of the node A 401 and the node B 402 to connect, which may vary depending on any WSN configuration method of the WSN. According to an embodiment of the present invention, it is illustrated that the sensor node 403 connects to an anchor node having a high signal strength, that is, the node A 401 and the node B 402, within a communication area of the sensor node 403.

The sensor node 403 recognizes a number of achievable radio signals including a signal 406 of the node A 401 and a signal 407 of the node B 402, within its communication area, and selects a node having a strongest signal from the achievable radio signals. In this example, since the signal 406 of the node A 401 is stronger than the signal 407 of the node B 402, the sensor node 403 selects the node A 401.

The node A 401 accepts a connection attempt of the sensor node 403, installed in the target, and connects to the sensor node 403. The node A 401 notifies the sink/gateway 409 about the connection via a number of nodes between the node A 401 and sink/gateway 409 through a multi-hop communication 408. Also, the node A 401 receives a connection admission from the sink/gateway 409 and completes the connection relationship. That is, the node A 401 transmits the connection attempt of the sensor node 403 to the sink/gateway 409 via the number of nodes, receives the connection admission from the sink/gateway 409 via the number of nodes, and thereby may completely set the connection relationship with the sensor node 403.

The positioning apparatus may recognize the location of the target based on the connection relationship. When location information of the node A 401 is revealed in the WSN, the location of the target where the sensor node 403, that is, the anchor node (hereinafter, referred to as node C, node D, and node E) is installed, may be determined as a surrounding of the node C. Also, the location of the target may be determined to be located within a radius of the communication area 405 of the node A 401 based on information about the communication area 405 of the node A 401.

Accordingly, the positioning apparatus may recognize that the target is located in the communication area 405 of the node A 401 connected to the sensor node 403.

Figure 5:
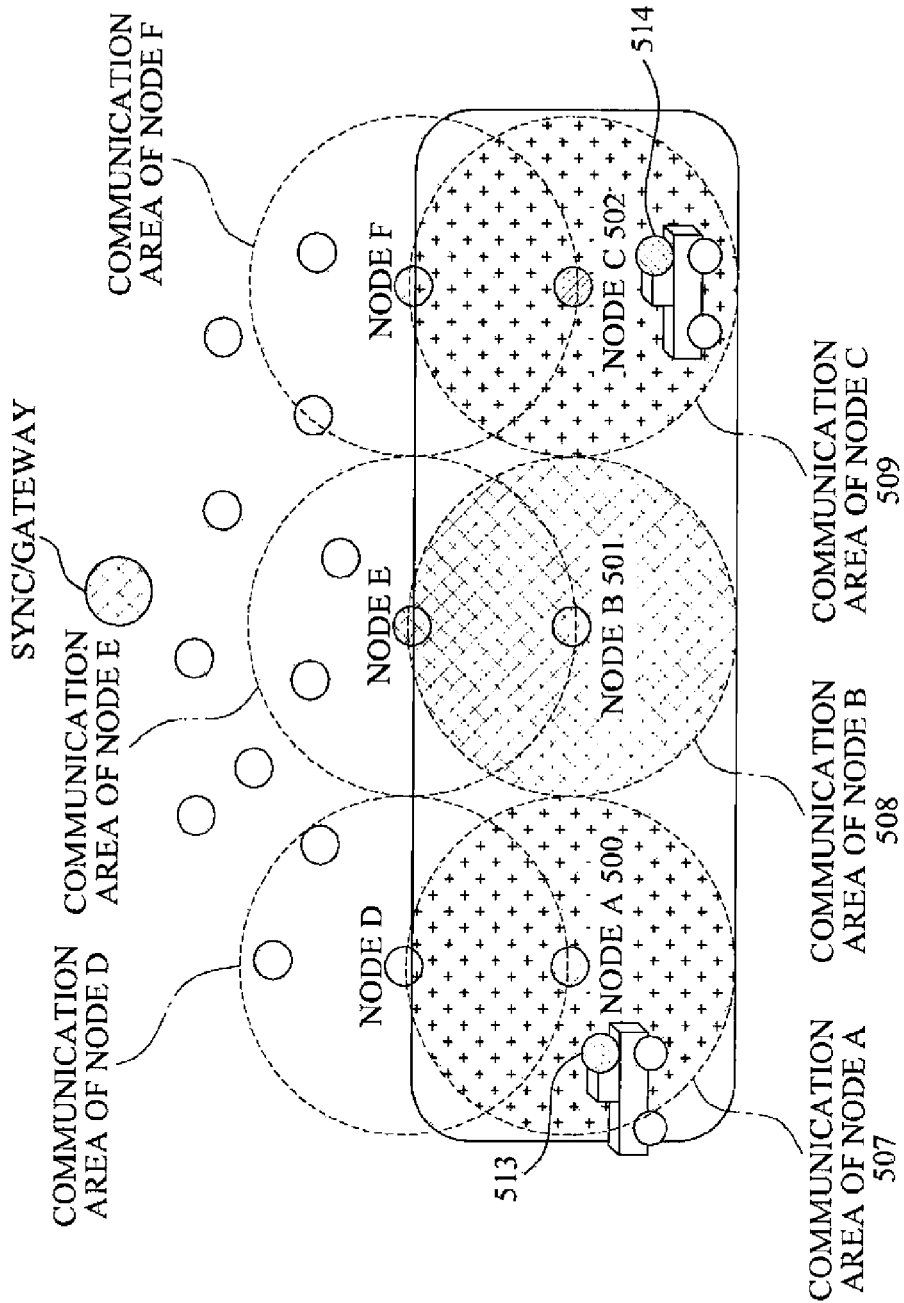
FIG. 5 is a diagram illustrating a regional positioning method based on a connection relationship according to an exemplary embodiment of the present invention.

FIG. 5 is a diagram illustrating a regional positioning method based on a connection relationship in a WSN according to an exemplary embodiment of the present invention. In FIG. 5, a locating premise is defined as a communication area 507 of a node A 500, communication area 508 of a node B 501, and communication area 509 of a node C 502.

As illustrated in FIG. 5, when a target with a sensor node 513 accesses the node A 500 and sets a connection relationship with the node A 500, a positioning apparatus may recognize that the target is located in the communication area 507 of the node A 500.

Also, when another target with a sensor node 514 accesses the node C 502 and sets a connection relationship with the node C 502, the positioning apparatus may recognize that the target is located in the communication area 509 of the node C 502. Additional nodes D, E and F and corresponding communication areas along with a sync/gateway are also provided.

Figure 6:
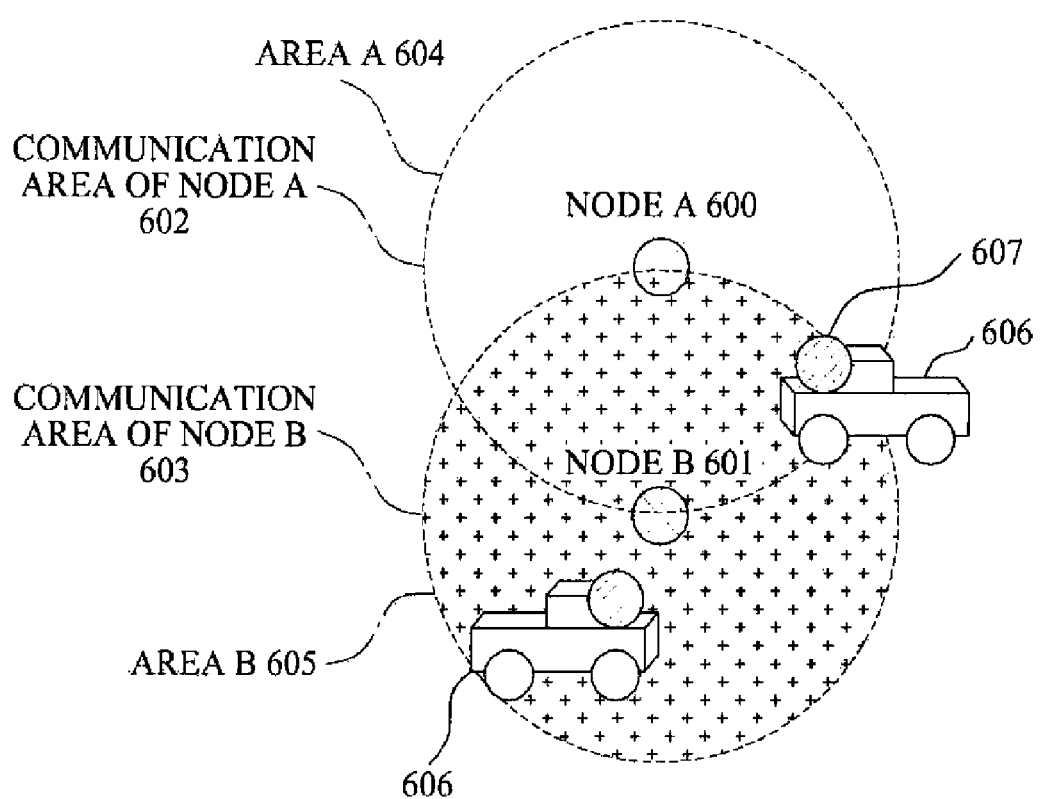
FIG. 6 is a diagram illustrating an example of a regional positioning method according to an exemplary embodiment of the present invention.

FIG. 6 is a diagram illustrating an example of a regional positioning according to an exemplary embodiment of the present invention.

As illustrated in FIG. 6, a number of anchor nodes may be required due to a broad locating premise. In this case, when a sensor node 607 installed in a target 606 is located in an area where a communication area 602 of a node A 600 and a communication area 603 of a node B 601 are overlapped, a positioning apparatus determines a node to set a connection relationship depending on a relative signal strength of the node A 600 and the node B 601. Accordingly, an area A 604 and an area B 605 may not be determined as an independent location. Thus, an area where the area A 604 and area B 605 are overlapped is required to be defined.

Figure 7:
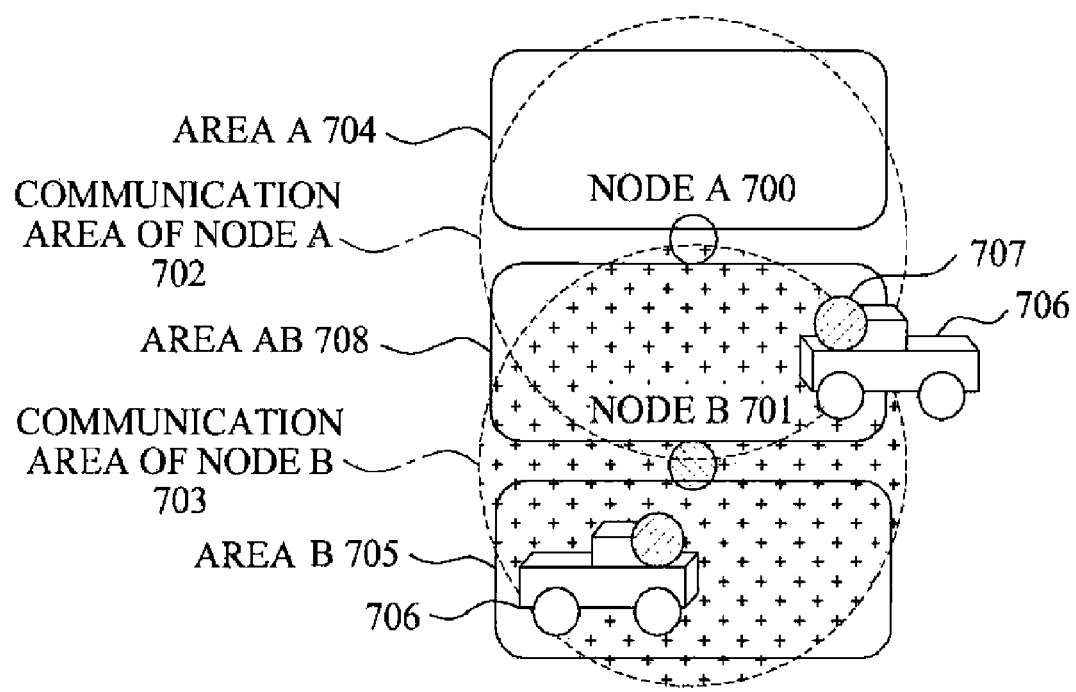
FIG. 7 is a diagram illustrating another example of a regional positioning method according to an exemplary embodiment of the present invention.

FIG. 7 is a diagram illustrating another example of a regional positioning according to an exemplary embodiment of the present invention. FIG. 7 illustrates a method of defining location recognition of an area where two communication areas are overlapped.

As illustrated in FIG. 7, when a target with a sensor node 707 is located in an area AB 708, a positioning apparatus may recognize a location of the target based on a connection relationship and sensing information. The area AB 708 is an area where a communication area 702 of a node A 700 and a communication area 703 of a node B 701 are overlapped such that the area AB 708 is determined to be the target 706's location as a region.

That is, each of the node A 700 and the node B 701, that is, an anchor node, includes a plurality of sensors, and each of the plurality of sensors senses the area AB 708 and generates sensing information. The positioning apparatus may distinguish non-overlapped areas, that is, an area A 704 and an area B 705, from the overlapped area, that is, the area AB 708, based on the generated sensing information and connection relationship. Accordingly, the positioning apparatus may recognize the location of the target more precisely.

Figure 8:
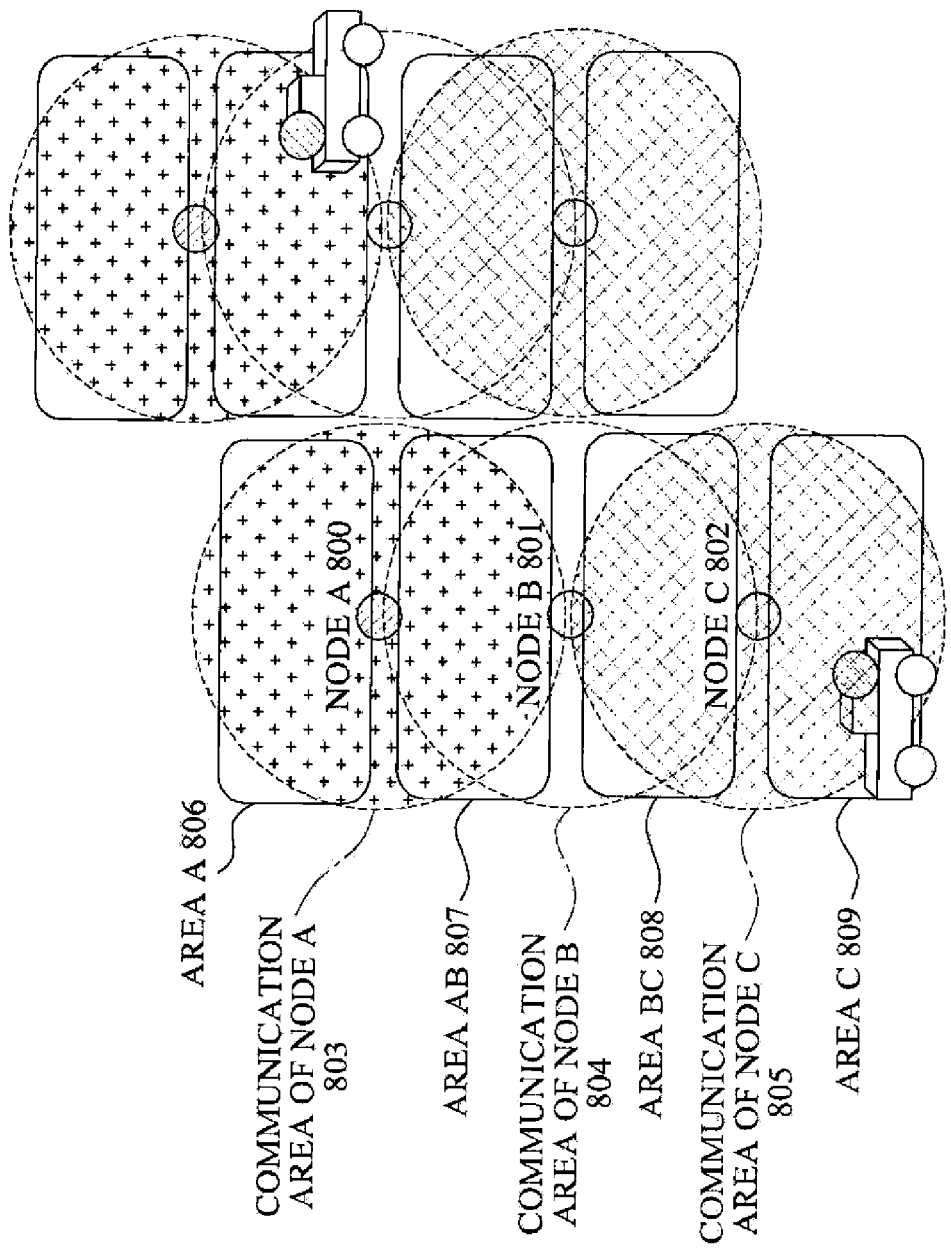
FIG. 8 is a diagram illustrating a regional positioning method based on a connection setting event and sensing area control according to an exemplary embodiment of the present invention.

FIG. 8 is a diagram illustrating a regional positioning method based on a connection setting event and sensing area control, particularly, with respect to a larger locating premise according to an exemplary embodiment of the present invention.

As illustrated in FIG. 8, a node A 800 has a communication area 803, a node B 801 has a communication area 804, and a node C 802 has a communication area 805. As described above, the locating premise may be divided into an independent area, that is, a non-overlapped area corresponding to an area A 806 and an area C 809, and a dependent area, that is, an overlapped area corresponding to an area AB 807 and an area BC 808.

A positioning apparatus may determine whether a target is located in the independent area such as the area A 806 and the area C 809 or the dependent area such as the area AB 807 and the area BC 808, based on a connection relationship between an anchor node and a sensor node installed in the target and sensing information of the anchor node.

Accordingly, the positioning apparatus may recognize the location of the target based on the determined area.

Figure 9:
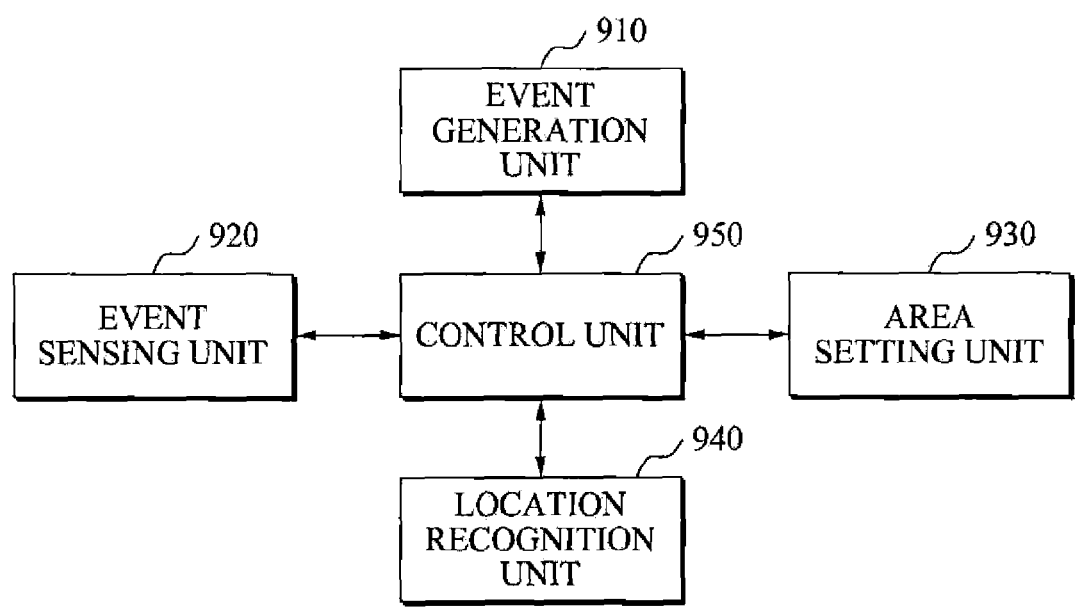
FIG. 9 is a block diagram illustrating a regional positioning apparatus in a WSN according to an exemplary embodiment of the present invention.

FIG. 9 is a block diagram illustrating a regional positioning apparatus in a WSN according to an exemplary embodiment of the present invention.

By referring to FIG. 9, the regional positioning apparatus in a WSN includes an event generation unit 910, event sensing unit 920, area setting unit 930, location recognition unit 940, and control unit 950.

The area setting unit 930 sets locating premises in the WSN based on a signal strength of an anchor node. Specifically, the area setting unit 930 may detect a communication radius of an anchor node using a signal strength of the anchor node and set the detected communication radius as the locating premise.

Also, the area setting unit 930 may divide the set locating premises into an overlapped area and a non-overlapped area further based on sensing information sensed by a plurality of sensors installed in the anchor node.

Accordingly, the location recognition unit 940 may detect whether the sensor node is located in the overlapped area or a non-overlapped area using the sensing information.

The area setting unit 930 may compute location information about the set locating premises using location information of the anchor node. Also, the location recognition unit 940 may recognize a location of a target using the computed location information of the anchor node.

When a sensor node senses a signal of an anchor node, the event generation unit 910 sets a network connection relationship between the sensor node and the anchor node, and generates an event corresponding to the set network connection relationship.

Accordingly, the location recognition unit 940 may retrieve the anchor node where the network connection relationship with the sensor node is set based on the event, and detect a locating premise corresponding to the retrieved anchor node.

The event sensing unit 920 senses the event generated when the sensor node, i.e. target node, installed in the target joins the WSN.

The location recognition unit 940 detects a locating premise where the sensor node is located based on the sensing of the event, and recognizes the location of the target based on the detected locating premise.

For example, when the target is a vehicle in a parking lot, the location recognition unit 940 may recognize an approximate location of the vehicle in the parking lot using location information of an anchor node. Accordingly, a parking lot manager may accurately recognize a location of the vehicle based on the approximate location through a visual ability of the parking lot manager.

The location recognition unit 940 transmits information about the recognized location of the target to a sink or gateway through a multi-hop communication to enable the information to be transmitted to a management server. Also, the location recognition unit 940 receives identification information from the sensor node of the target, and transmits the received identification information to the sink or gateway through the multi-hop communication to enable the identification information to be transmitted to the management server.

The control unit 950 controls the regional positioning apparatus in the WSN. Specifically, the control unit 950 may control an operation of the event generation unit 910, event sensing unit 920, area setting unit 930, and location recognition unit 940.

As described above, a regional positioning apparatus and method in a WSN according to the present invention may recognize an approximate regional location without much network traffic load, using a characteristic of the sensor network that a target node desires to join, instead of determining a location of the target through a calculation based on strength of a number of radio signals. Also, the regional positioning apparatus and method defines divided areas using sensing information of an anchor node, and thereby may determine the location of the target. In this instance, a location of the anchor node is previously known.

According to the present invention, a regional positioning method and apparatus in a WSN may recognize a location of a target based on a connection setting of a sensor node installed in the target.

Also, according to the present invention, a regional positioning method and apparatus in a WSN sets a locating premise that may be sorted as a communication radius in a sensor network, and thereby may recognize a location of a target.

Also, according to the present invention, a regional positioning method and apparatus in a WSN obtains approximate regional location information, and thereby may reduce a network traffic load as well as satisfy an application requirement.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A regional positioning method in a wireless sensor network (WSN), the regional positioning method comprising:
    setting a plurality of locating premises in the WSN based on a signal strength of a plurality of anchor nodes to be sensed via a sensor node installed in a target;
    sensing, via the sensor node, an anchor node having a stronger signal of the plurality of anchor nodes and setting a network connection relationship between the sensor node and the anchor node;
    generating an event corresponding to the network connection relationship set;
    sensing the event where the sensor node joins the WSN when setting the network communication relationship with the anchor node;
    detecting a locating premise of the plurality of locating premises where the sensor node is located based on the sensing of the event; and
    recognizing a location of the target based on the network connection relationship and the detected locating premise.

2. The regional positioning method of claim 1,
    wherein the recognizing comprises:
    retrieving the anchor node where the network connection relationship with the sensor node is set based on the event; and
    detecting a locating premise of the plurality of locating premises corresponding to the retrieved anchor node.

3. The regional positioning method of claim 1, further comprising:
dividing the detected locating premise into an overlapped area and a non-overlapped area based on sensing information sensed by a plurality of sensors installed in the anchor node,
wherein the detecting comprises:
detecting whether the sensor node is located in the overlapped area or the non-overlapped area using the sensing information.

4. The regional positioning method of claim 1, further comprising:
computing location information about the set plurality of locating premises using location information of the anchor node,
wherein the recognizing comprises:
recognizing the location of the target using the computed location information of the anchor node.

5. The regional positioning method of claim 1, further comprising:
transmitting information about the recognized location of the sensor node to a sink through a multi-hop communication to enable the information to be transmitted to a management server.

6. The regional positioning method of claim 1, further comprising:
receiving identification information about the target from the sensor node; and
transmitting the received identification information to a sink through a multi-hop communication to enable the identification information to be transmitted to a management server.

7. A regional positioning apparatus in a WSN, the regional positioning apparatus comprising:
an area setting unit to set a plurality of locating premises in the WSN based on a signal strength of a plurality of anchor nodes to be sensed via a sensor node installed in a target;
an event generation unit to set, when the sensor node senses the anchor nodes having a stronger signal of the plurality of anchor nodes, a network connection relationship between the sensor node and the anchor node, and to generate an event corresponding to the network connection relationship set;
an event sensing unit to sense the event where the sensor node joins the WSN when setting the network connection relationship with the anchor node; and
a location recognition unit to detect a locating premise of the plurality of locating premises where the sensor node is located based on the sensing of the event, and recognize a location of the target based on the network connection relationship and the detected locating premise.

8. The regional positioning apparatus of claim 7, wherein the location recognition unit retrieves the anchor node where the network connection relationship with the sensor node is set based on the event, and detects a locating premise of the plurality of locating premises corresponding to the retrieved anchor node.

9. The regional positioning apparatus of claim 7, wherein the area of setting unit divides the set plurality of locating premises into an overlapped area and a non-overlapped area further based on sensing information sensed by a plurality of sensors installed in the anchor node, and the location recognition unit detects whether the sensor node is located in the overlapped area or the non-overlapped area using the sensing information.

10. The regional positioning apparatus of claim 7, wherein the area setting unit computes location information about the set plurality of locating premises using location information of the anchor node, and the location recognition unit recognizes the location of the target node using the computed location information of the anchor node.

11. The regional positioning apparatus of claim 7, wherein the location recognition unit transmits information about the recognized location of the target to a sink through a multi-hop communication to enable the information to be transmitted to a management server.

12. The regional positioning, apparatus of claim 7, wherein the location recognition unit receives identification information about the target from the sensor node, and transmits the received identification information to a sink through a multi-hop communication to enable the identification information to be transmitted to a management server.

13. A positioning method within a wireless sensor network (WSN), for determining a location of a target based on a connection relationship, the method comprising:
selecting an anchor node having a stronger signal of a plurality of anchor nodes, via a sensor node installed in the target, to establish a network connection relationship;
setting the network connection relationship between the sensor node and the selected anchor node; and
recognizing a location of the target based on the network connection relationship and a location of the anchor node.

14. The positioning method of claim 13, wherein the sensor node selects the anchor node from the plurality of anchor nodes based upon a radio signal strength thereof.

15. The positioning method of claim 13, wherein setting the network connection relationship comprises:
sending, via the sensor node, a connection attempt to the selected anchor node;
accepting, via the anchor node, a connection attempt of the sensor node at the anchor node;
notifying a gateway about the connection attempt via a plurality of nodes through a multi-hop communication between the selected anchor node and the gateway; and
receiving, at the anchor node, a connection admission from the gateway via the plurality of nodes to complete the setting of the network connection relationship.

16. The positioning method of claim 15, wherein recognizing a location of the target further comprises: determining a locating premise of the anchor node.

* * * * *